United States Patent
Kupermann et al.

(10) Patent No.: US 9,820,018 B2
(45) Date of Patent: Nov. 14, 2017

(54) LOW POWER SENSING APPARATUS AND METHOD USING A COMBINATION OF VIRTUAL MACHINE AND DEDICATED HARDWARE INTELLECTUAL PROPERTY IP BLOCK

(71) Applicant: INTEL CORPORATION, Santa Clara, CA (US)

(72) Inventors: Eli Kupermann, Maale Adumim (IL); Suryaprasad Kareenahalli, Folsom, CA (US); Christian Soby, Hjoerring (DK); Amit Kimelman, Har Adar (IL); Rajasekaran Andiappan, Ekenas (FI); Elena Agranovsky, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/967,297

(22) Filed: Dec. 12, 2015

(65) Prior Publication Data

US 2017/0171645 A1 Jun. 15, 2017

(51) Int. Cl.
*G08C 19/22* (2006.01)
*H04Q 9/00* (2006.01)
*G06F 12/0811* (2016.01)
*G06F 9/455* (2006.01)
*G06F 1/32* (2006.01)
*G05B 15/02* (2006.01)

(52) U.S. Cl.
CPC ............... *H04Q 9/00* (2013.01); *G05B 15/02* (2013.01); *G06F 1/3287* (2013.01); *G06F 1/3296* (2013.01); *G06F 9/45558* (2013.01); *G06F 12/0811* (2013.01); *G06F 2009/45575* (2013.01); *G06F 2009/45591* (2013.01); *G06F 2212/283* (2013.01)

(58) Field of Classification Search
CPC .......................................................... H04Q 9/00
USPC ....................................................... 340/870.07
See application file for complete search history.

(56) References Cited

U.S. PATENT DOCUMENTS

| | | | | |
|---|---|---|---|---|
| 9,111,047 B1* | 8/2015 | Shridhar | ............... | G06F 13/40 |
| 2009/0124870 A1* | 5/2009 | Arends | ............. | A61B 5/02438 600/301 |
| 2009/0132993 A1* | 5/2009 | Mani | ....................... | G06F 8/34 717/105 |
| 2009/0143045 A1* | 6/2009 | Graves | ............... | A61B 5/02055 455/404.1 |
| 2013/0347058 A1* | 12/2013 | Smith | ..................... | G06F 21/57 726/1 |
| 2014/0358469 A1* | 12/2014 | Graf | ..................... | G01D 11/00 702/127 |
| 2015/0082000 A1* | 3/2015 | Hong | ................. | G06F 12/1009 711/205 |

\* cited by examiner

*Primary Examiner* — Santiago Garcia
(74) *Attorney, Agent, or Firm* — Green, Howard & Mughal LLP (57) ABSTRACT

Described is an apparatus comprising: a processor operable to execute a virtual machine manager (VMM) which is to manage a virtual machine (VM) for a hardware intellectual property (IP) block; a communication fabric; and a hardware IP block coupled to the processor via the communication fabric, wherein the hardware IP block is to be coupled to a first set of one or more sensors, and wherein the VM and the hardware IP block are operable to process data collected from the first set.

25 Claims, 7 Drawing Sheets

LOW POWER SENSING APPARATUS AND METHOD USING A COMBINATION OF VIRTUAL MACHINE AND DEDICATED HARDWARE INTELLECTUAL PROPERTY IP BLOCK

BACKGROUND

Constrained cost structure of computing devices, such as smartphone, does not allow dedicated hardware (HW) Intellectual Property (IP) blocks with memory and computation resources sufficient to perform all platform sensing usages. On the other end of the spectrum, a hardware-less solution does not meet the sensing power budget to satisfy industry standards for selected use cases. Therefore, there is a need to develop a cost efficient and power efficient sensor hub solution for computing devices (e.g., smartphones, tablets, wearable devices, etc.).

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
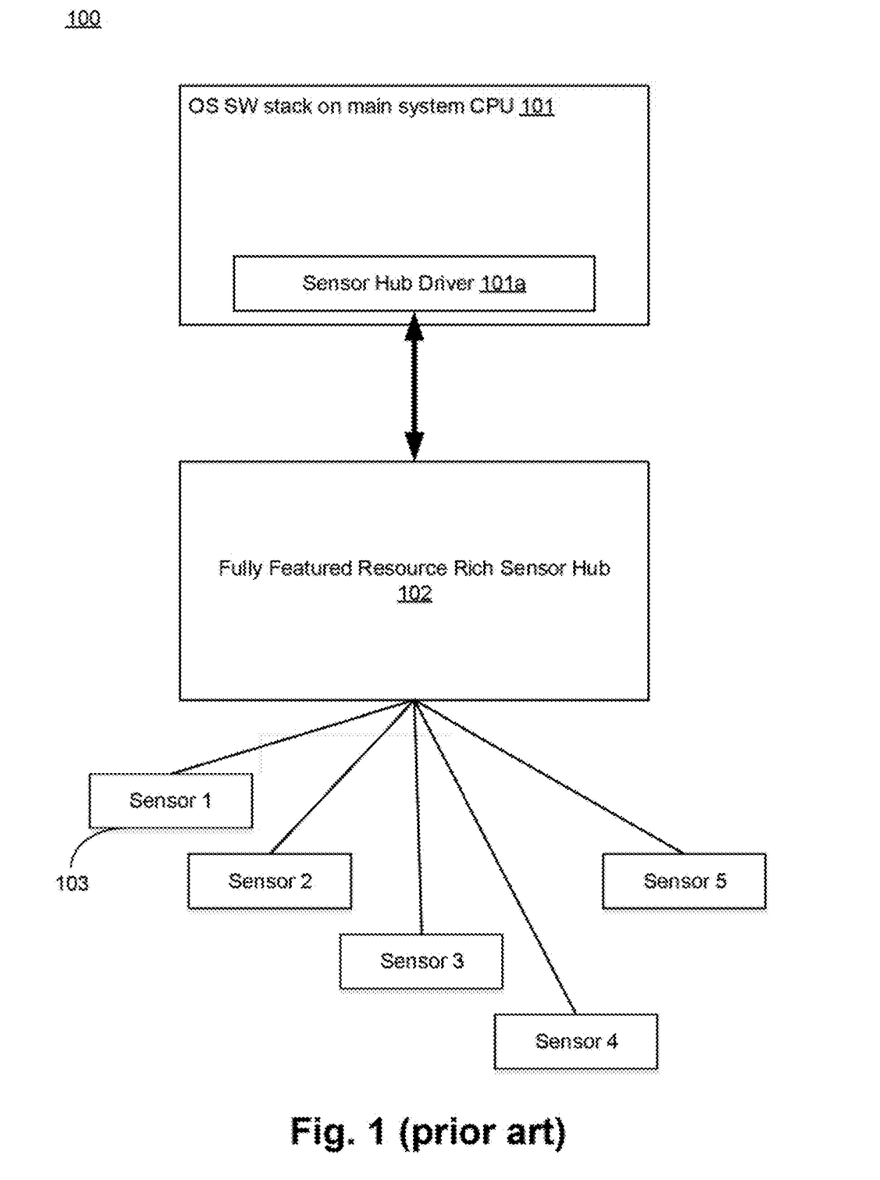
FIG. 1 illustrates a computer system with a fully featured resource rich sensor hub.

FIG. 1 illustrates computer system 100 with a fully featured resource rich sensor hub. Computer system 100 consists of an Operating System (OS) Software (SW) stack on a main system Central Processing Unit (CPU) 101 (hereinafter OS SW stack 101), fully featured resource rich Sensor Hub (SH) 102 (hereinafter high power SH 102), and plurality of sensors 103 (e.g., Sensor 1, Sensor 2, . . . , Sensor 5). Some sensors, in the plurality, such as gyroscopes, may consume high processing bandwidth of SH 102 compared to other sensors such as pedometers. As such, SH 102 is designed to cater a wide variety of sensors of various power requirements. The high power SH 102 communicates with OS SW 101 via SH Driver 101*a*. This sensing scheme (i.e., computer system 100) consumes high power because SH 102 is expected to process commands from the OS SW stack 101, manage the plurality of sensors 103, and collect, analyze, and process sensor data. As such, the sensing scheme of FIG. 1 is not suitable for low power devices, such as wearable devices.

Various embodiments described here provide a low power sensing scheme by splitting the sensing functionality between a virtual machine (VM) and a small dedicated hardware (HW) Intellectual Property (IP) block. In some embodiments, the VM includes sufficient memory and compute capabilities, while the dedicated small HW IP block provides cost effective sensing solution for low power use cases.

Some embodiments enable keeping all the sensing usage under a black box sensor hub interface and maintain low power budget for selected use cases (e.g., wake detect, step counting, etc.) using quarter of the gate count of a full featured sensor hub dedicated HW block (e.g., SH 102 of FIG. 1). A software only VM solution may not meet the power requirements of a small computing device, while a dedicated full featured HW block (such as SH 102) may not allow meeting the cost target of the computing device such as a phone platform.

In some embodiments, the VM hides the limitations of the HW based sensor and projects to a user (e.g., an operating system) that the HW based sensor includes all features that a highly powered hardware based sensor is expected to have. These limitations of the HW based sensor are implemented within the VM, in accordance with some embodiments. As such, from a user's standpoint, low power is consumed by the device or sensing system, yet results of a highly powered dedicated hardware (e.g., sensing scheme of FIG. 1) based sensor are obtained.

In some embodiments, the VM enables a software (e.g., an operating system) to be unaware of the split between the HW IP block and the VM because there is unified interface (e.g., a single interface) between the operating system and the sensor hub. As such, whether sensor data is collected by the small sensor hub HW or by VM directly, the operating system accesses that data through that unified interface.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level. The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C). The terms "left," "right," "front," "back," "top," "bottom," "over," "under," the like in the description and in the claims, if any, are used for descriptive purposes and not necessarily for describing permanent relative positions.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors—BJT PNP/NPN, BiCMOS, CMOS, etc., may be used without departing from the scope of the disclosure.

Figure 2:
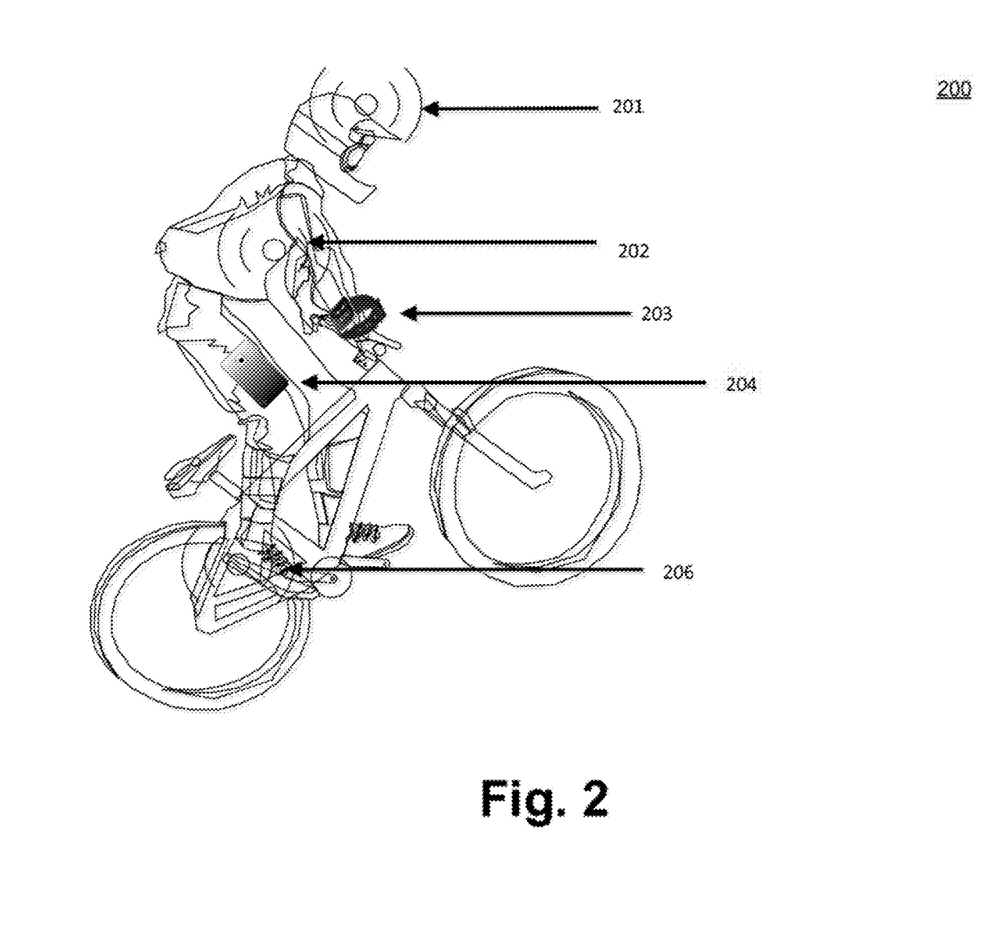
FIG. 2 illustrates an ensemble of wearable devices including a device with a sensing architecture that uses a virtual machine (VM) and a hardware (HW) intellectual property (IP) block for sensing, according to some embodiments of the disclosure.

FIG. 2 illustrates ensemble 200 of wearable devices including a device with a sensing architecture that uses a VM and a HW IP block, according to some embodiments of the disclosure. In this example, ensemble 200 is on a person and his/her ride (here, a bicycle). However, the embodiments are not limited to such. Other scenarios of wearable devices and their usage may work with the various embodiments.

For example, in some embodiments, sensor nodes can be embedded into some other products (e.g., walls in a house, vehicles, clothes, body of a person, etc.) and can be controlled using a controller, gateway device, or computing device. The sensor node(s) of some embodiments can also be part of a wearable device. The term "wearable device" (or wearable computing device) generally refers to a device coupled to a person. For example, devices (such as sensors, cameras, speakers, microphones (mic), smartphones, smart watches, etc.) which are directly attached on a person or on the person's clothing are within the scope of wearable devices.

In some examples, wearable computing devices may be powered by a main power supply such as an AC/DC (Alternating Current and/or Direct Current) power outlet. In some examples, wearable computing devices may be powered by a battery. In some examples, wearable computing devices may be powered by a specialized external source based on Near Field Communication (NFC). The specialized external source may provide an electromagnetic field that may be harvested by circuitry at the wearable computing device. Another way to power the wearable computing device is electromagnetic field associated with wireless communication, for example, WLAN transmissions. WLAN transmissions use far field radio communications that have a far greater range to power a wearable computing device than NFC transmission. WLAN transmissions are commonly used for wireless communications with most types of terminal computing devices.

For example, the WLAN transmissions may be used in accordance with one or more WLAN standards based on Carrier Sense Multiple Access with Collision Detection (CSMA/CD) such as those promulgated by the Institute of Electrical Engineers (IEEE). These WLAN standards may be based on CSMA/CD wireless technologies such as Wi-Fi™ and may include Ethernet wireless standards (including progenies and variants) associated with the IEEE 802.11-2012 Standard for Information technology—Telecommunications and information exchange between systems—Local and metropolitan area networks—Specific requirements Part 11: WLAN Media Access Controller (MAC) and Physical Layer (PHY) Specifications, published March 2012, and/or later versions of this standard ("IEEE 802.11").

Continuing with the example of FIG. 2, ensemble 200 of wearable devices includes device 201 (e.g., camera, microphone, etc.) on a helmet, device 202 (e.g., blood pressure sensor, etc.) on the person's arm, device 203 (e.g., a smart watch that can function as a terminal controller or a device to be controlled), device 204 (e.g., a smart phone and/or tablet in a pocket of the person's clothing), and device 206 (e.g., an accelerometer to measure paddling speed). In some embodiments, ensemble 200 of wearable devices has the capability to communicate by wireless energy harvesting mechanisms or other types of wireless transmission mechanisms.

In some embodiments, device 203 (e.g., smart watch) includes a sensing architecture that uses a VM and a HW IP block (or HW sensor hub). This VM is a sensor hub VM (SH VM) in that it establishes communication with the HW IP block. In some embodiments, the HW IP block is an always-ON (AON) HW block (e.g., an always powered on hardware block). In some embodiments, the sensing solution, provided by device 203, is split between the dedicated AON sensor hub HW block and the SH VM. In some embodiments, the AON HW IP block comprises sensor drivers and algorithms required to handle low power use cases while the VM contains the rest of the algorithms, drivers, and host interface handling logic.

In some embodiments, the host operating system (which is executing on device 203) is not aware of the sensor hub functionality being split into VM and HW IP block because the VM provides a unified sensing host interface to the host operating system. In some embodiments, the AON HW IP block is capable to operate autonomously by keeping the host software (SW) and the VM in low power mode (e.g., sleep state) until a wake event is detected or a batch of sensor samples need to be delivered to the host (e.g., the processing engine of device 203).

Figure 3:
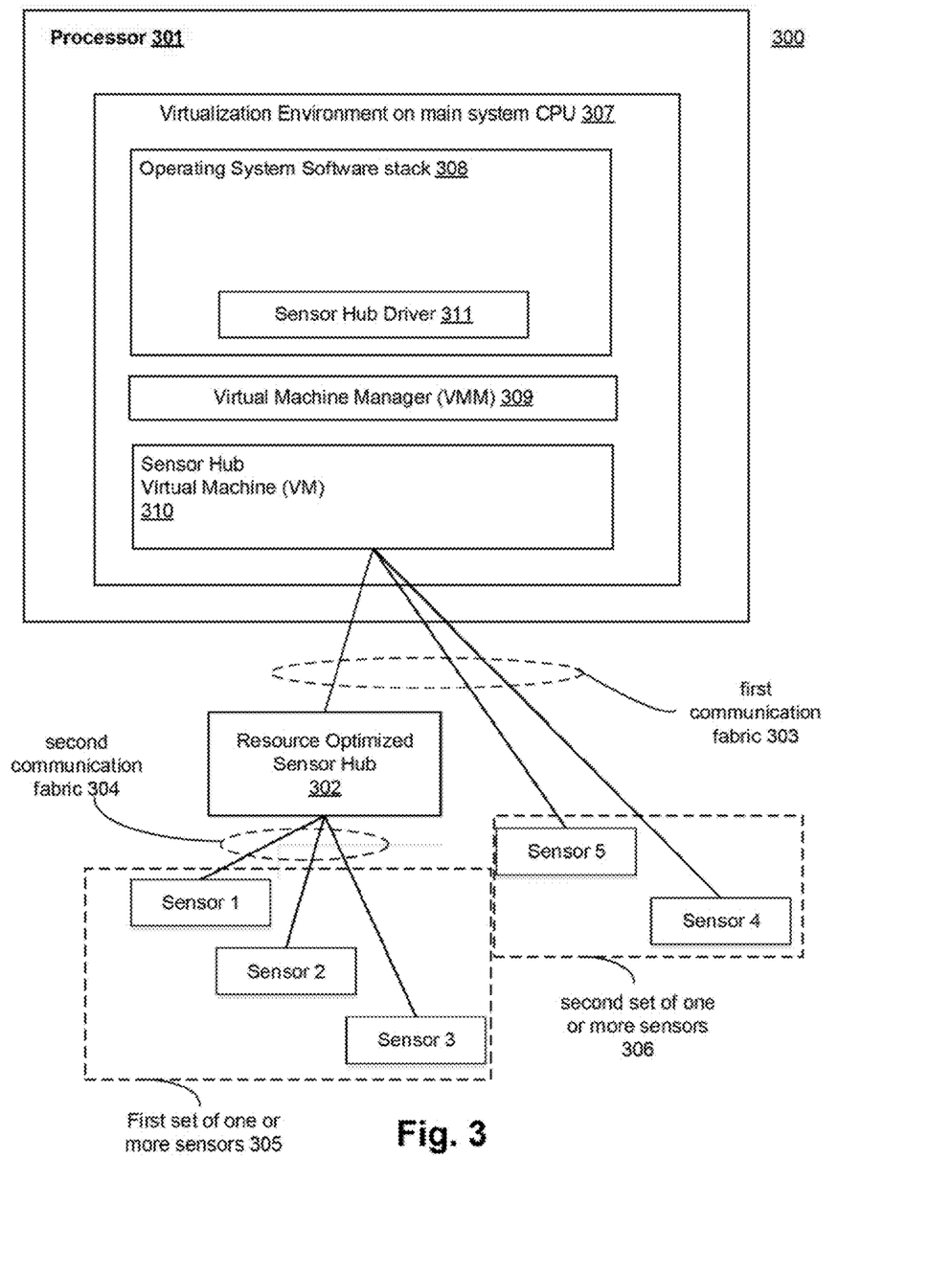
FIG. 3 illustrates a computer system with a sensing architecture formed from a combination of VM and HW IP block, according to some embodiments of the disclosure.

FIG. 3 illustrates computer system 300 (or a sensing system) with a sensing architecture formed from a combination of a VM and HW IP block, according to some embodiments of the disclosure. It is pointed out that those elements of FIG. 3 having the same reference numbers (or names) as the elements of any other figure can operate or function in any manner similar to that described, but are not limited to such.

In some embodiments, computer system 300 comprises Processor 301, Resource Optimized Sensor Hub 302 (or HW IP block 302), first communication fabric 303, second communication fabric 304, first set of one or more sensors 305, and second set of one or more sensors 306. In some embodiments, Processor 301 comprises Virtualization Environment 307. In some embodiments, Virtualization Environment 307 comprises: Operating System Software (OS SW) stack 308, Virtual Machine Manager (VMM) 309, and Sensor Hub VM 310. In some embodiments, OS SW stack 308 includes Sensor Hub Driver 311.

While the embodiment of FIG. 3 illustrates HW IP block 302 being outside Processor 301, it may be integrated within Processor 301 such that Processor 301 and HW IP block 302 are part of a System-on-Chip (SoC). In some embodiments, Processor 301 and HW IP block 302 are separately packaged integrated circuits.

In some embodiments, Processor 301 is a low power processor such as those designed and manufactured by Intel Corporation of Santa Clara Calif. In some embodiments, Processor 301 is Digital Signal Processor (DSP), an Application Specific Integrated Circuit (ASIC), a general purpose Central Processing Unit (CPU), or any other processing unit that can execute Virtualization Environment 307.

In some embodiments, HW IP block 302 is a stripped down version of the regular Full SH HW 102 (e.g., those available in the processing cores of an x86 Intel Architecture based processor). In some embodiments, HW IP block 302 comprises a processing logic (e.g., Laptop Mode Tool (LMT) enabled CPU), first memory (e.g., Level-1 Cache), and a second memory (e.g., a closely coupled memory for code and data storage). In some embodiments, the LMT CPU directly executes from the second memory. In some embodiments, HW IP block 302 is optimized for lower power (e.g., it uses a low power memory architecture, operates at a low frequency (e.g., 100 MHz) and low power supply (e.g., 07V). As such, in some embodiments, HW IP block 302 is an AON block (e.g., always powered on) that can perform continuous sensing and low level processing of sensor data.

From a software perspective, in some embodiments, HW IP block 302 comprises two components. In some embodiments, the first component is a real-time operating system with AON SH hardware and debug capabilities, and the ability to schedule sensor firmware tasks. In some embodiments, the second component is a sensor firmware which comprises sensor drivers. In some embodiments, the second component includes a low power sensor processing core for sensors which need to be AON and support AON derived/ virtual sensors. In some embodiments, HW IP block 302 includes firmware (FW) that implements sensor algorithms for the virtual sensors and calibration of sensors.

Here, the term "virtual sensor" generally refers to software based sensors that consume sensor data from other sensors and produce their own sensor output as opposed to physical sensor drivers that retrieve sensor data from a physical sensor device via an input-output (IO) interface such as I2C or SPI (Serial Peripheral Interface). An example of a virtual sensor is a step counter which consumes data from an accelerometer sensor (which is physical sensor driver) and produces step counter as output. Other examples of virtual sensor or derived sensors (that providing sensing data which is derived from other sensors) are calibrated accelerometer (that derives data from an accelerometer) and activity context detection sensor.

In some embodiments, Processor 301 communicates with the second set of one or more sensors 306 via the first communication fabric 303. In some embodiments, HW IP block 302 communicates with Processor 301 via first communication fabric 303. In some embodiments, first communication fabric 303 is an I2C interface compliant fabric. In other embodiments, other types of low power communication fabrics may be used. For example, SPI (Serial Peripheral Interface) compliant IO can be used for implementing a low power communication fabric. In some embodiments, HW IP block 302 communicates with the first set of one or more sensors 305 via second communication fabric 304. In some embodiments, second communication fabric 304 is an I2C interface compliant fabric. In other embodiments, other types of low power communication fabrics (e.g., SPI) may be used for second communication fabric 304.

In some embodiments, the first set of one or more sensors 305 includes one or more of: Uncalibrated Magnetometer; Calibrated Magnetometer; Accelerometer; Accelerometer with offset correction; low power Uncalibrated Gyroscope; low power Calibrated Gyroscope; low power Gyroscope with offset correction; Gravity linear acceleration orientation or compass; Physical activity sensor; Pedometer; Significant motion and tilt selector; Movement detection; Face up/down landscape portrait; DM (Dynamic Mesh) 6DOF (six degrees of freedom) AM (Amplitude Modulation) or inclination AM; Ambient light sensor; Proximity sensor; or Pressure sensor.

In some embodiments, the second set of one or more sensors 306 includes one or more of: Uncalibrated Gyroscope; Calibrated Gyroscope; Gyroscope with offset correction; Bio-Sensors (e.g., for detection of an analyte), Environmental sensors, etc. In some embodiments, the first set of one or more sensors 305 consumes less power than the second set of one or more sensors 306.

In some embodiments, Virtualization Environment 307 provides a virtual (rather than an actual) version of a hardware, including virtual computer hardware platforms, operating systems, etc. In some embodiments, Operating System stack 308 is executed in Virtualization Environment 307. As such, Operating System stack 308 is operable to access many different virtual hardware and software as if the hardware is real. In some embodiments, the various virtual entities that are accessible to Operating System stack 308 are referred to as virtual machines.

In some embodiments, a Sensor Hub Virtual Machine 310 is described, which provides access to HW SH 302. A VM is a duplicate of a real machine. In some embodiments, VM 310 is a software implementation of a sensor hub and executes programs as expected to be executed by the sensor hub. In some embodiments, VM 310 emulates a fully featured sensor hub, like SH 102, to OP SW stack 308. In some embodiments, even though VM 310 emulates a fully featured sensor hub like SH 102, VM 310 splits its functions between itself and a real HW IP block 302.

In some embodiments, the impact of VM 310 on power of a use case is small to none. Here, the term "use case" describes sensor usage. For example, a sensor counting user steps while user walks with the device in the pocket is an instance of a use case. In some embodiments, VM 310 is woken up by HW IP block 302 based on events from first set of sensors 305. In some embodiments, VM 310 implements a similar layer of software as in SH 102 but in a higher scale of capabilities close to a SH 102 implemented in a processor (e.g., Intel® Atom processor and core platforms). As such, VM 310 keeps the OS side of the drivers (e.g., Driver 311) and sensor stack (e.g., 308) unchanged (e.g., OS 308 is agnostic between full SH such as SH 102 and sensor/SH VM 310), in accordance with some embodiments.

In some embodiments, VM 310 comprises the following layers of software (similar to Full SH 102): SH kernel with HW drivers; sensor core (e.g., processing logic); sensor drivers for the sensors which are not connected to AON SH 302 but connected to VM 310; sensor algorithms which are typically used when the system is in a high power state (e.g., Turbo mode) and are may not be used for always-on (AON) SH 302; sensor algorithms with high duty cycles (e.g., run once in 10 seconds or 30 seconds); HID (human interface device) host interface, etc.

In some embodiments, the sensor algorithms in VM 310 can request AON SH 302 to buffer sensor data and send it up to VM 310 (e.g., accelerometer data sent once in 5 seconds, etc.). In some embodiments, VM 310 can perform one or more algorithms or methods such as environmental sensing (e.g., ultraviolet, humidity, ambient temperature; pressure/altitude, heat index; extended Kalman filter for nine degrees of freedom (9DOF)); user programmable gestures; instant activity context; advanced terminal context; and bio-sensing (e.g., heart rate, electrocardiogram, peripheral capillary oxygen saturation sensing ($SpO_2$), etc.).

In some embodiments, VMM 309 is provided, which is also referred to as a hypervisor or virtual machine monitor. In some embodiments, VMM 309 is a software, firmware, or hardware that creates and runs or executes virtual machines including VM 310. A person skilled in the art would appreciate that a computer on which a hypervisor is running one or more virtual machines is defined as a host machine. As such, Processor 301 is part of the host machine. Each virtual machine is called a guest machine. As such, VM 310 is a guest machine managed by VMM 309, in accordance with some embodiments.

In some embodiments, VMM 309 executes on Processor 301 and implements multiple usage specific VMs such as, Modem VM, Operations System VM, Security VM, and SH VM 310. In some embodiments, VMM 309 presents OS Software stack 308 with a virtual operating platform and manages the execution of OS Software stack 308. While the embodiment of FIG. 3 illustrates one OS Software stack 308, multiple instances of a variety of operating systems may share the virtualized hardware resources, in accordance with some embodiments.

In some embodiments, SH Driver 311 is provided to OS SW stack 308 to communicate with HW SH 302 or to sensors of the second set of one or more sensors 306. In some embodiments, SH Driver 311 is a software, firmware, or hardware. In some embodiments, SH Driver 311 provides OS SW stack 308 with access to sensors of the first set 305 and sensors of the second set 306 as if OS SW stack 308 is directly communicating with those sensors. In some embodiments, information is passed to and from SH Driver 311 and the first set 305 and second set 306 of sensors via VMM 309.

In some embodiments, sensor data collected from the second set of one or more sensors 306 is provided to SH Driver 311 via VM 310 and VMM 309. In some embodiments, the sensor data collected from the first set of one or more sensors 305 is provided to SH Driver 311 via SH 302, VM 310, and VMM 309.

In some embodiments, HW IP block 302 is an always-on (AON) hardware IP block which is to autonomously operate with the one or more sensors of the first set while VM 310 is asleep. For example, when Processor 301 is in low power mode (e.g., sleep state), HW IP block 302 may continue to operate (because it is designed to operate at a low power state) and manage sensors of the first set 305. In some embodiments, HW IP block 302 is to wake up VM 310 when an event is detected by the one or more sensors of the first set 305 or when the data collected from the one or more sensors of the first set 305 is to be delivered to Processor 301.

Figure 4:
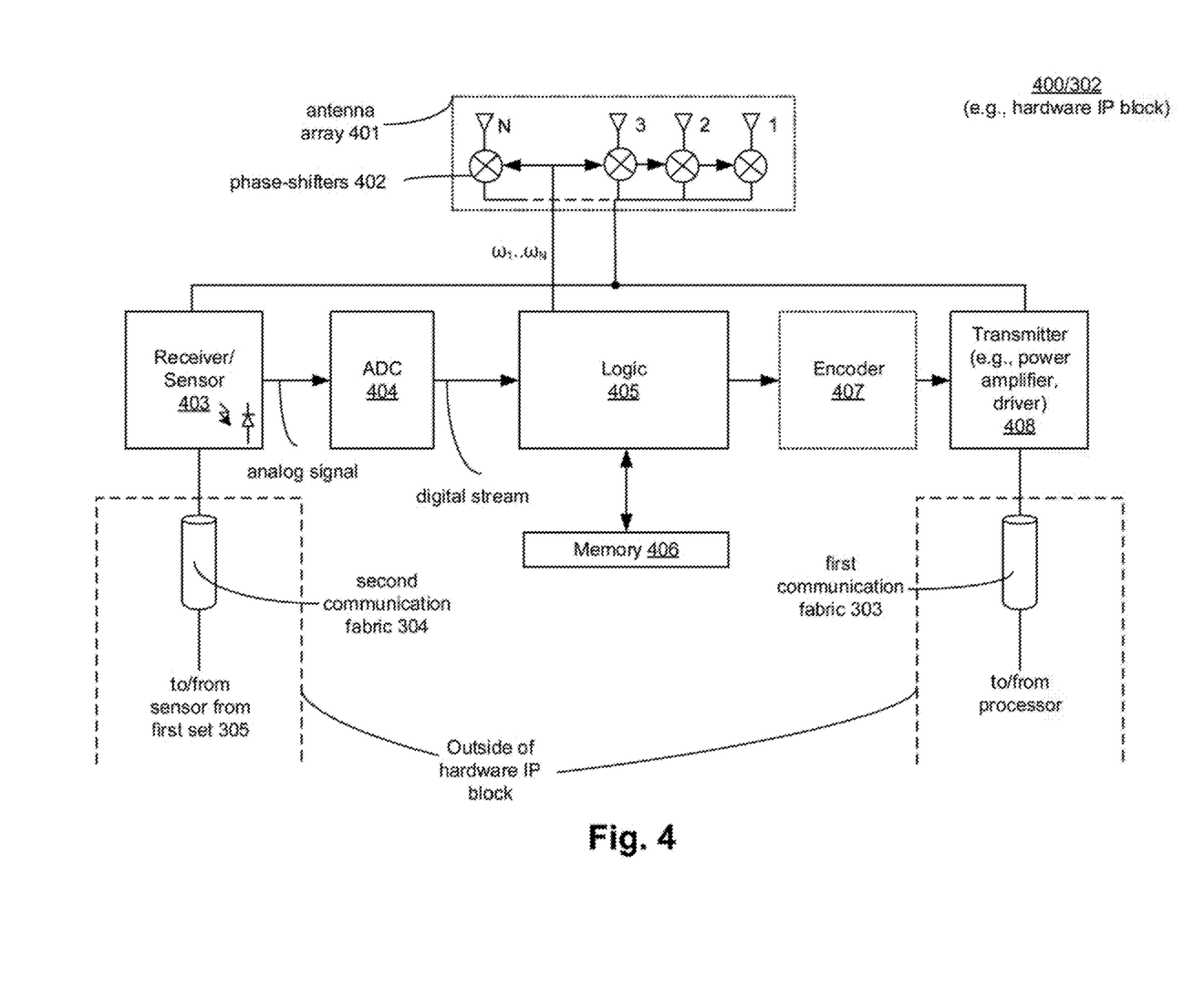
FIG. 4 illustrates a high level overview of the HW IP block, according to some embodiments of the disclosure.

FIG. 4 illustrates a high level overview of HW IP block 400 (e.g., SH HW IP block 302), according to some embodiments of the disclosure. It is pointed out that those elements of FIG. 4 having the same reference numbers (or names) as the elements of any other figure can operate or function in any manner similar to that described, but are not limited to such. In some embodiments, HW IP block 400 comprises antenna array 401, phase-shifters 402, Receiver/Sensor 403, analog-to-digital converter (ADC) 404, Logic 405, Memory 406, and Transmitter 408. In some embodiments, HW IP block 400 includes Encoder 407.

In some embodiments, antenna array 401 may comprise one or more of directional or omnidirectional antennas 1 through 'N,' where 'N' is an integer, including monopole antennas, dipole antennas, loop antennas, patch antennas, microstrip antennas, coplanar wave antennas, or other types of antennas suitable for transmission of Radio Frequency (RF) signals. In some multiple-input multiple-output (MIMO) embodiments, antenna array 401 are separated to take advantage of spatial diversity.

In some embodiments, phase-shifters 402 are provided to tune the phase of the receiving/transmitting signal. For example, each antenna of antenna array 401 may be coupled to a corresponding phase-shifter, such that phase-shifter 402 coupled to antenna 1 receives phase input $\omega 1$, phase-shifter 402 coupled to antenna 2 receives phase input $\omega 2$, and so on. Any known phase-shifter may be used for phase-shifters 402.

In some embodiments, Receiver/Sensor 403 detects the received signal and amplifies it to generate an analog signal. For example, Receiver 403 receives sensor data collected from first set of one or more sensors 305. An analog signal is any continuous signal for which the time varying feature (variable) of the signal is a representation of some other time varying quantity (i.e., analogous to another time varying signal). In some embodiments, Receiver/Sensor 403 comprises a Low Noise Amplifier (LNA). In some embodiments, Receiver/Sensor 403 includes a sensor to measure a certain attribute of a bodily function (e.g., pulse rate).

In some embodiments, each sensor of the first set 305 operates in different frequency channel to allow simultaneous reception by Receiver 403 of sensor data from multiple sensors. Alternatively, in some embodiments, time-sharing can be coordinated between the sensors of first set 305 operating in the same frequency channel. In some embodiments, Receiver 403 receives sensor data through second communication fabric 304 (e.g., I2C compliant interconnect). In some embodiments, Receiver 403 receives sensor data wirelessly via antenna array 401. As such, Receiver 403 is capable of receiving data through wired and wireless means, in accordance with some embodiments.

In some embodiments, the analog signal from Receiver 403 is converted into a digital stream by ADC 404. A digital signal or stream is a physical signal that is a representation of a sequence of discrete values (i.e., a quantified discrete-time signal), for example of an arbitrary bit stream. Any suitable low power ADC may be used to implement ADC 404. For example, ADC 404 is one of: direct-conversion ADC (for flash ADC), successive-approximation ADC, ramp-compare ADC, Wilkinson ADC, integrating ADC, delta-encoded ADC or counter-ramp, pipeline ADC (also called subranging quantizer), sigma-delta ADC (also known as a delta-sigma ADC), time-interleaved ADC, ADC with intermediate FM stage, or time-stretch ADC.

In some embodiments, the digital stream is received by Logic 405 and processed. In some embodiments, Logic 405 (e.g., a Finite State Machine) is a low power logic which is operable to perform basic functions such as to monitor which sensors of first set of one or more sensors 305 are active and operating, collect data sensed by first set of one or more sensors 305, in some cases analyze the collected data, initiate communication with VM 310, and receive instructions from VM 310. In some embodiments, Logic 405 executes a real-time operating system (RTOS). A RTOS is an OS which is to serve real-time applications and to process data as it comes in, typically without buffering delays.

For example, RTOS is capable of processing sensor data from the first set 305 in real-time. In some embodiments, RTOS is operable to perform at least one of: cooperative scheduling, preemptive scheduling (e.g., rate-monotonic scheduling, round-robin scheduling, fixed priority pre-emptive scheduling, fixed-priority scheduling with deferred pre-emption, fixed-priority non-preemptive scheduling, critical section preemptive scheduling, static time scheduling, etc.), easiest deadline first approach, stochastic digraphs with multi-threaded graph traversal, etc.

In some embodiments, Logic 405 includes sensor drivers for communicating with sensors of first set 305. In some embodiments, these sensor drivers can be software, firmware, or hardware. In some embodiments, Logic 405 is capable of communicating with derived or virtual sensors. In some embodiments, Logic 405 is operable to perform various algorithms to process sensor data.

For example, Logic 405 can perform basic digital processing (e.g., digital filtering, peak detection, etc.) of sensor data. In some embodiments, Logic 405 implements sensor buffers, as part of data acquisition engine, for various algorithms to have access to, for performing their operations. In some embodiments, sensors of first set 305 and algorithms performed by Logic 405 are selected for AON SH 400 based on factors such as the need for the sensors and algorithms to be always-on (e.g., constant monitoring by sensor), size of code to be executed by Logic 405, latency tolerance, and power targets.

In some embodiments, Logic 405 is part of a low power processing unit of HW IP block 400. In some embodiments, Logic 405 stores collected data from sensors in Memory 406. In some embodiments, Memory 406 is level-1 cache. In some embodiments, Memory 406 is a non-volatile memory (e.g., NAND flash memory, magnetic random access memory (MRAM), etc.).

In some embodiments, the output of Logic 405 is encoded by Encoder 407 before it is sent to Transmitter 408. One purpose of encoding is to reduce power dissipation in communicating logic such as Transmitter 408. Encoding the data can also secure the output of sensors from malicious hacks. Any known encoding scheme may be used by Encoder 407. In some embodiments, data processed by Logic 405 is directly provided to Transmitter 408 (i.e., data is not encoded by Encoder 407).

In some embodiments, Transmitter 408 may use any known transmitting scheme. In some embodiments, Transmitter 408 is compliant with WiGig transmission standard (i.e., IEEE 802.11ad transmitting standard). In some embodiments, Transmitter 408 uses WLAN transmissions in accordance with one or more WLAN standards based on CSMA/CD such as those promulgated by the IEEE. In some embodiments, Transmitter 408 may use Long Term Evolution (LTE) compliant transmission mechanisms.

Any suitable low power transmitter may be used for implementing Transmitter 408 (e.g., a transmitter having low power amplifier driver). In some embodiments, Transmitter 408 converts the encoded data to an analog radio frequency (RF) signal which is then transmitted by antenna array 401 to Processor 301. In other embodiments, other forms of wireless transmissions may be used by Transmitter 408.

In some embodiments, Transmitter 408 includes a digital-to-analog converter (DAC) (not shown) to convert the encoded probe request and/or probe response messages into analog signal(s) for transmission. In some embodiments, the DAC is a pulse-width modulator (PWM). In some embodiments, the DAC is an oversampling DAC or interpolating DAC such as sigma-delta DAC. In other embodiments, other types of low power DACs may be used. For example, the DAC of Transmitter 408 is one of switched resistor DAC, switched current source DAC, switched capacitor DAC, R-2R binary weighted DAC, Successive-Approximation or Cyclic DAC, thermometer-coded DAC, etc. The output the DAC is an analog signal which is amplified and then transmitted to antenna array 401 to the other device(s), according to some embodiments.

In some embodiments, Transmitter 408 comprises a push-pull based input-output driver that is operable to transmit data to Processor 301 via first communication fabric 303. In some embodiments, Transmitter 408 is a transceiver (i.e., with a built-in transmitter and receiver) which is operable to receive data from Processor 301 via first communication fabric 303.

Figure 5A:
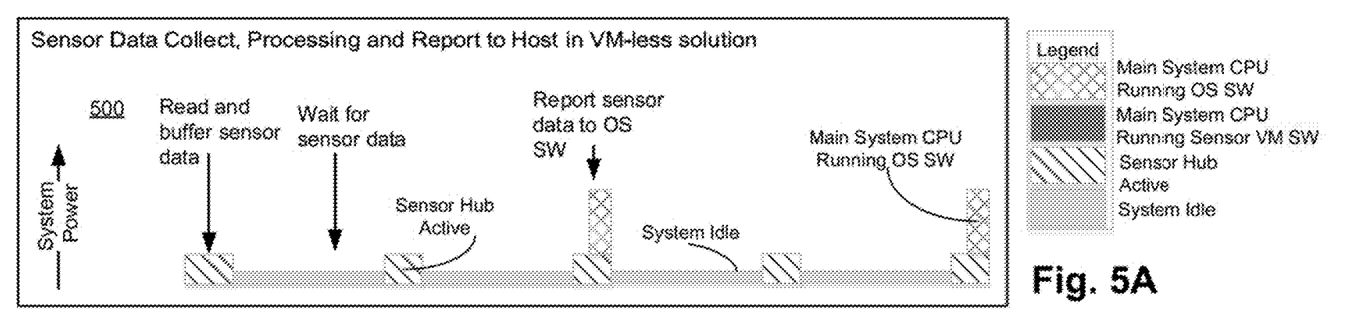
FIG. 5A-C illustrate plots comparing system power using systems of FIG. 1, FIG. 3, and a system that does not depend on host software (SW) for processing sensor data, respectively, according to some embodiments of the disclosure.
Figure 5B:
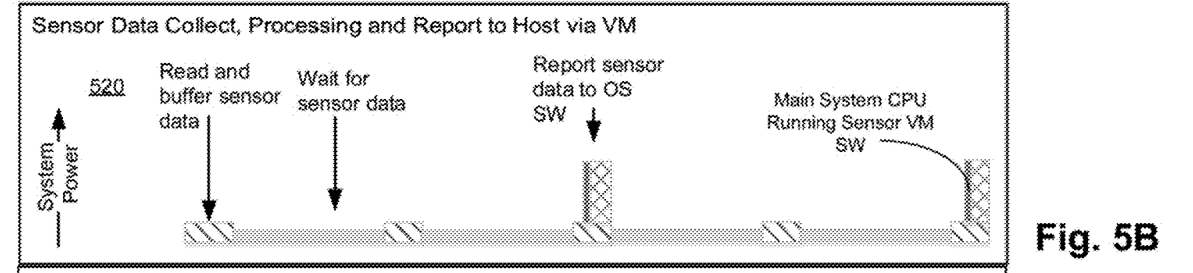
Figure 5C:
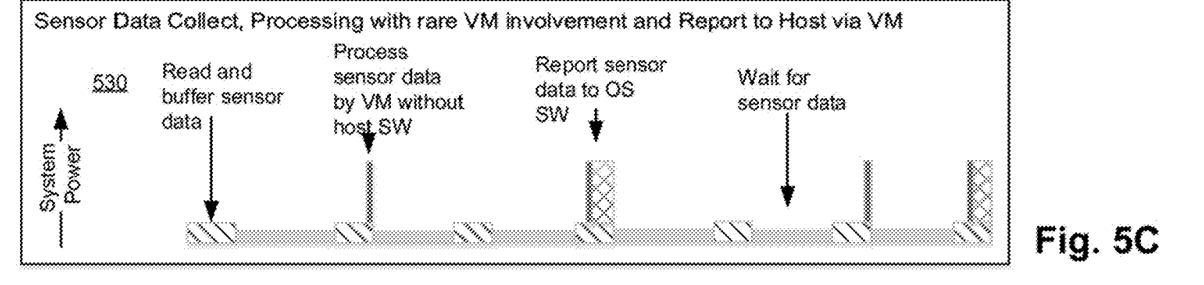

FIG. 5A-C illustrate plots 500, 520, and 530, respectively, comparing system power using systems of FIG. 1, FIG. 3, and a system that does not depend on host software (SW) for processing sensor data, respectively, according to some embodiments of the disclosure. It is pointed out that those elements of FIGS. 5A-C having the same reference numbers (or names) as the elements of any other figure can operate or function in any manner similar to that described, but are not limited to such.

Here, legends for the various activities are listed to the right. These activities include: power consumed by the Main System CPU running OS SW (e.g., Processors 101 or 301), power consumed by Main System CPU Running Sensor VM SW (e.g., Processor 301), power consumed by sensor Hub when Active (e.g., SH HW 302), and power consumed by System at Idle state (e.g., system 100 or 300). The various activities shown over time for each plot include: reading and buffering sensor data, waiting for sensor data, and reporting sensor data to OS SW.

Plot 500 illustrates system power over time for system 100 in VM-less solution. Plot 520 illustrates system power over time for system 300 in VM based solution. Plot 530 illustrates system power over time for a system that rarely uses VM (e.g., the case where sensors from second set 306 directly communicate with Processor 301 via VMM 309 and VM 310). Overall, the power consumed by system 300 is lower than the power consumed by system 100 for the same kind of sensors. This reduction in power is illustrated by the lower height of the various boxes/rectangles (associated with the legends).

The VM based solution of the various embodiments does not introduce significant power compared to the VM-less solutions. Plots 520 and 530 illustrate two use cases. In plot 520, the VM works when the sensor hub reports data to host SW 308. In this case, host Processor 301 has to be powered on for the sake of getting the sensor hub report from SH 302, thus the VM work does not introduce visible power impact. In plot 530, the VM works very rarely. In this example, the use case power is calculated as an average power consumption. Rare VM work has almost invisible impact on the average consumption.

Figure 6:
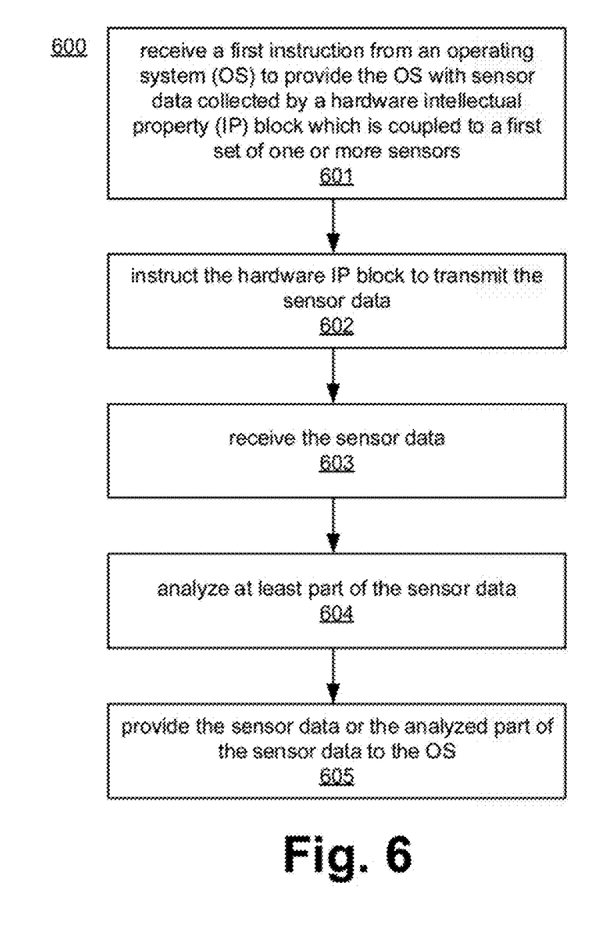
FIG. 6 illustrates a flowchart of a method performed by the VM for sensing and processing data, according to some embodiments of the disclosure.

FIG. 6 illustrates flowchart 600 of a method performed by VM 310 for sensing and processing data, according to some embodiments of the disclosure. It is pointed out that those elements of FIG. 6 having the same reference numbers (or names) as the elements of any other figure can operate or function in any manner similar to that described, but are not limited to such.

Although the blocks in the flowchart with reference to FIG. 6 are shown in a particular order, the order of the actions can be modified. Thus, the illustrated embodiments can be performed in a different order, and some actions/blocks may be performed in parallel. Some of the blocks and/or operations listed in FIG. 6 are optional in accordance with certain embodiments. The numbering of the blocks presented is for the sake of clarity and is not intended to prescribe an order of operations in which the various blocks must occur. Additionally, operations from the various flows may be utilized in a variety of combinations.

At block 601, VM 310 receives a first instruction from OS SW stack 308 to provide the OS with sensor data collected by HW IP block 302 which is coupled to the first set of one or more sensors 305. At block 602, VM 310 instructs HW IP block 302 to transmit the sensor data it has collected. In some embodiments, VM 310 instructs HW IP block 302 to transmit the sensor data collected in real-time to VM 310. For example, sensor data is transmitted to VM 310 as it is collected. In some embodiments, VM 310 instructs HW IP block 302 to transmit the sensor data stored in Memory 406. At block 603, VM 310 receives the sensor data via first communication fabric 303.

At block 604, VM 310 analyzes at least part of the sensor data. For example, HW IP block 302 may have already analyzed some data and so VM 310 analyzes the remaining data. In some embodiments, VM 310 analyzes all data received from HW IP block 302. In some embodiments, VM 310 applies any number of algorithms to process the sensor data. At block 605, VM 310 provides the sensor data or the analyzed part of the sensor data to OS SW stack 308.

In some embodiments, VM 310 receives a second instruction from OS SW stack 308 to provide the OS with sensor data from the second set of one or more sensors 306. In some embodiments, the method performed by VM 310 causes VM 310 to receive the sensor data from the second set 306, analyze at least part of the sensor data, and provide the sensor data or the analyzed part of the sensor data to OS SW stack 308.

In some embodiments, VM 310 receives an instruction from OS SW stack 308 to enter a low power state (e.g., sleep state). In some embodiments, the method further comprises VM 310 entering a low power state and receiving an indication from the SH HW IP block 302 to wake up from the low power state when SH HW IP block 302 detects an event by at least one of the one or more sensors of first set 305 or when the data collected from the one or more sensors of first set 305 is to be transmitted.

Figure 7:
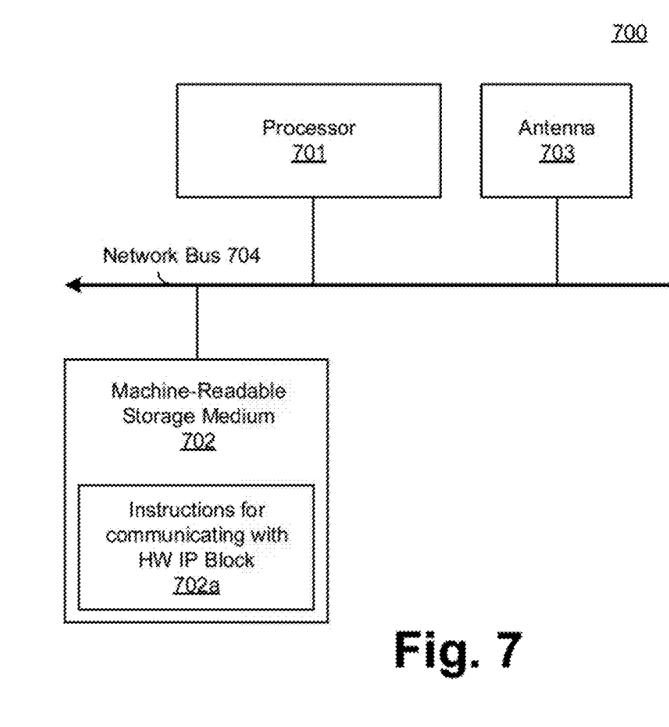
FIG. 7 illustrates a part of system of FIG. 3 with a machine readable storage medium (or media) having instructions for communicating with the HW IP block, according to some embodiments of the disclosure.

FIG. 7 illustrates a part of system 700 of FIG. 3 with machine readable storage medium having instructions for communicating with HW IP block 302, according to some embodiments of the disclosure. It is pointed out that those elements of FIG. 7 having the same reference numbers (or names) as the elements of any other figure can operate or function in any manner similar to that described, but are not limited to such.

In some embodiments, system 700 (or sensing system 300) comprises a low power Processor 701 (same as Processor 301). In some embodiments, Processor 701 is a Digital Signal Processor (DSP), an Application Specific Integrated Circuit (ASIC), a general purpose Central Processing Unit (CPU), or a low power logic implementing a simple finite state machine to perform the method of flowchart 600 and/or various embodiments, etc. In some embodiments, system 700 comprises Machine-Readable Storage Medium 702 (also referred to as tangible machine readable medium), Antenna 703, and Network Bus 704.

In some embodiments, the various logic blocks of system 700 are coupled together via Network Bus 704. Any suitable protocol may be used to implement Network Bus 704. In some embodiments, Machine-Readable Storage Medium 702 includes Instructions 702*a* (also referred to as the program software code/instructions) for calculating or measuring distance and relative orientation of a device with reference to another device as described with reference to various embodiments and flowchart.

Program software code/instructions 702*a* associated with flowchart 600 (and/or various embodiments) and executed to implement embodiments of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software" or firmware embedded in processor. In some embodiments, the program software code/instructions associated with flowchart 600 (and/or various embodiments) are executed by system 700.

In some embodiments, the program software code/instructions 702*a* associated with flowchart 600 (and/or various embodiments) are stored in a computer executable storage medium 702 and executed by Processor 701. Here, computer executable storage medium 702 is a tangible machine readable medium that can be used to store program software code/instructions and data that, when executed by a computing device, causes one or more processors (e.g., Processor 701) to perform a method(s) as may be recited in one or more accompanying claims directed to the disclosed subject matter.

The tangible machine readable medium 702 may include storage of the executable software program code/instructions 702*a* and data in various tangible locations, including for example ROM, volatile RAM, non-volatile memory and/or cache and/or other tangible memory as referenced in the present application. Portions of this program software code/instructions 702a and/or data may be stored in any one of these storage and memory devices. Further, the program software code/instructions can be obtained from other storage, including, e.g., through centralized servers or peer to peer networks and the like, including the Internet. Different portions of the software program code/instructions and data can be obtained at different times and in different communication sessions or in the same communication session.

The software program code/instructions 702a (associated with flowchart 600 and other embodiments) and data can be obtained in their entirety prior to the execution of a respective software program or application by the computing device. Alternatively, portions of the software program code/instructions 702a and data can be obtained dynamically, e.g., just in time, when needed for execution. Alternatively, some combination of these ways of obtaining the software program code/instructions 702a and data may occur, e.g., for different applications, components, programs, objects, modules, routines or other sequences of instructions or organization of sequences of instructions, by way of example. Thus, it is not required that the data and instructions be on a tangible machine readable medium in entirety at a particular instance of time.

Examples of tangible computer-readable media 702 include but are not limited to recordable and non-recordable type media such as volatile and non-volatile memory devices, read only memory (ROM), random access memory (RAM), flash memory devices, floppy and other removable disks, magnetic storage media, optical storage media (e.g., Compact Disk Read-Only Memory (CD ROMS), Digital Versatile Disks (DVDs), etc.), among others. The software program code/instructions may be temporarily stored in digital tangible communication links while implementing electrical, optical, acoustical or other forms of propagating signals, such as carrier waves, infrared signals, digital signals, etc. through such tangible communication links.

In general, tangible machine readable medium 702 includes any tangible mechanism that provides (i.e., stores and/or transmits in digital form, e.g., data packets) information in a form accessible by a machine (i.e., a computing device), which may be included, e.g., in a communication device, a computing device, a network device, a personal digital assistant, a manufacturing tool, a mobile communication device, whether or not able to download and run applications and subsidized applications from the communication network, such as the Internet, e.g., an iPhone®, Galaxy®, Blackberry® Droid®, or the like, or any other device including a computing device. In one embodiment, processor-based system is in a form of or included within a PDA (personal digital assistant), a cellular phone, a notebook computer, a tablet, a game console, a set top box, an embedded system, a TV (television), a personal desktop computer, etc. Alternatively, the traditional communication applications and subsidized application(s) may be used in some embodiments of the disclosed subject matter.

Figure 8:
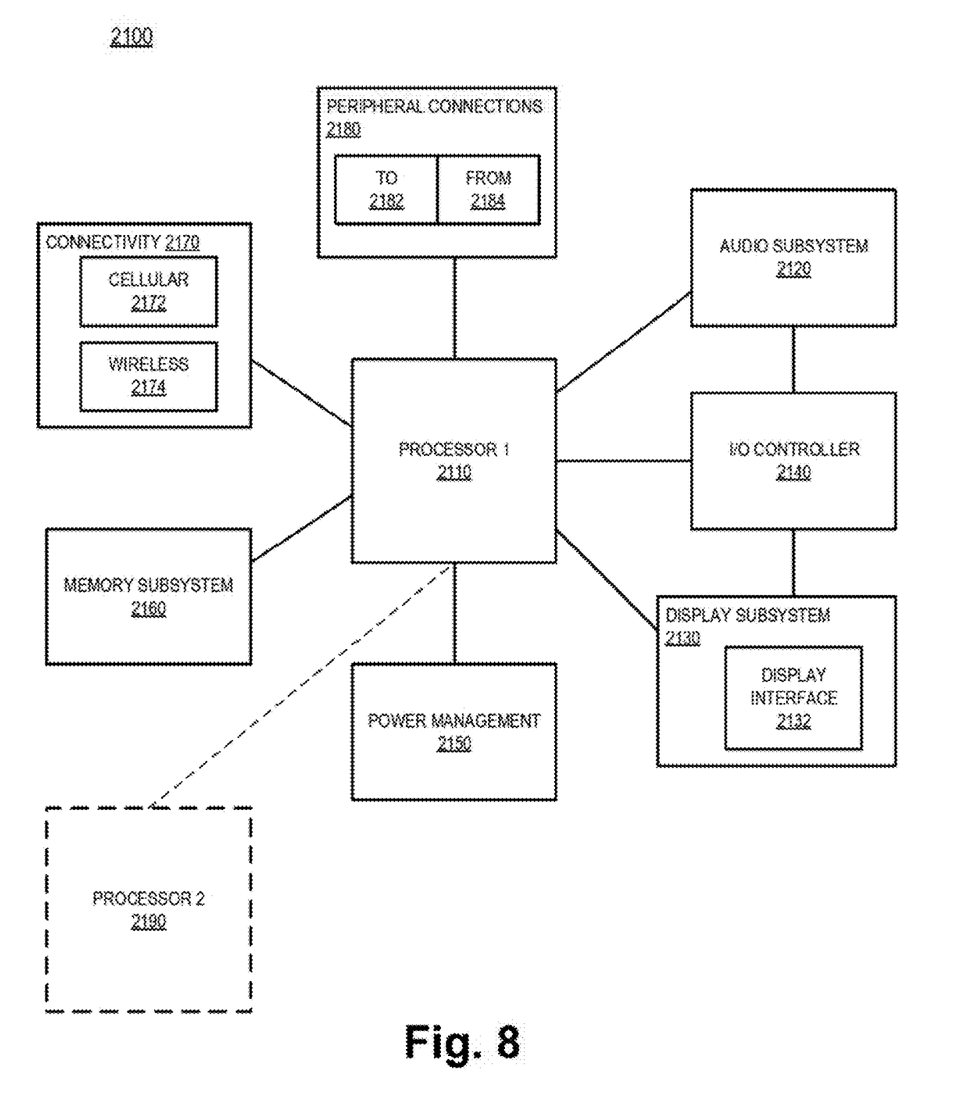
FIG. 8 illustrates a smart device or a computer system or a SoC (System-on-Chip) with a sensing architecture formed from a combination of VM and HW IP block, according to some embodiments.

FIG. 8 illustrates a smart device or a computer system or a SoC (System-on-Chip) 2100 with a sensing architecture formed from a combination of VM (e.g., VM 310) and HW IP block (e.g., HW IP block 302), according to some embodiments. It is pointed out that those elements of FIG. 8 having the same reference numbers (or names) as the elements of any other figure can operate or function in any manner similar to that described, but are not limited to such.

FIG. 8 illustrates a block diagram of an embodiment of a mobile device in which flat surface interface connectors could be used. In some embodiments, computing device 2100 represents a mobile computing device, such as a computing tablet, a mobile phone or smart-phone, a wireless-enabled e-reader, or other wireless mobile device. It will be understood that certain components are shown generally, and not all components of such a device are shown in computing device 2100.

In some embodiments, computing device 2100 includes a first processor 2110. The various embodiments of the present disclosure may also comprise a network interface within 2170 such as a wireless interface so that a system embodiment may be incorporated into a wireless device, for example, cell phone or personal digital assistant.

In one embodiment, processor 2110 (and/or processor 2190) can include one or more physical devices, such as microprocessors, application processors, microcontrollers, programmable logic devices, or other processing means. The processing operations performed by processor 2110 include the execution of an operating platform or operating system on which applications and/or device functions are executed. The processing operations include operations related to I/O (input/output) with a human user or with other devices, operations related to power management, and/or operations related to connecting the computing device 2100 to another device. The processing operations may also include operations related to audio I/O and/or display I/O.

In one embodiment, computing device 2100 includes audio subsystem 2120, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 2100, or connected to the computing device 2100. In one embodiment, a user interacts with the computing device 2100 by providing audio commands that are received and processed by processor 2110.

Display subsystem 2130 represents hardware (e.g., display devices) and software (e.g., drivers) components that provide a visual and/or tactile display for a user to interact with the computing device 2100. Display subsystem 2130 includes display interface 2132, which includes the particular screen or hardware device used to provide a display to a user. In one embodiment, display interface 2132 includes logic separate from processor 2110 to perform at least some processing related to the display. In one embodiment, display subsystem 2130 includes a touch screen (or touch pad) device that provides both output and input to a user.

I/O controller 2140 represents hardware devices and software components related to interaction with a user. I/O controller 2140 is operable to manage hardware that is part of audio subsystem 2120 and/or display subsystem 2130. Additionally, I/O controller 2140 illustrates a connection point for additional devices that connect to computing device 2100 through which a user might interact with the system. For example, devices that can be attached to the computing device 2100 might include microphone devices, speaker or stereo systems, video systems or other display devices, keyboard or keypad devices, or other I/O devices for use with specific applications such as card readers or other devices.

As mentioned above, I/O controller 2140 can interact with audio subsystem 2120 and/or display subsystem 2130. For example, input through a microphone or other audio device can provide input or commands for one or more applications or functions of the computing device 2100. Additionally, audio output can be provided instead of, or in addition to display output. In another example, if display subsystem 2130 includes a touch screen, the display device also acts as an input device, which can be at least partially managed by I/O controller 2140. There can also be additional buttons or switches on the computing device 2100 to provide I/O functions managed by I/O controller 2140.

In one embodiment, I/O controller 2140 manages devices such as accelerometers, cameras, light sensors or other environmental sensors, or other hardware that can be included in the computing device 2100. The input can be part of direct user interaction, as well as providing environmental input to the system to influence its operations (such as filtering for noise, adjusting displays for brightness detection, applying a flash for a camera, or other features).

In one embodiment, computing device 2100 includes power management 2150 that manages battery power usage, charging of the battery, and features related to power saving operation. Memory subsystem 2160 includes memory devices for storing information in computing device 2100. Memory can include nonvolatile (state does not change if power to the memory device is interrupted) and/or volatile (state is indeterminate if power to the memory device is interrupted) memory devices. Memory subsystem 2160 can store application data, user data, music, photos, documents, or other data, as well as system data (whether long-term or temporary) related to the execution of the applications and functions of the computing device 2100.

Elements of embodiments are also provided as a machine-readable medium (e.g., memory 2160) for storing the computer-executable instructions. The machine-readable medium (e.g., memory 2160) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 2170 includes hardware devices (e.g., wireless and/or wired connectors and communication hardware) and software components (e.g., drivers, protocol stacks) to enable the computing device 2100 to communicate with external devices. The computing device 2100 could be separate devices, such as other computing devices, wireless access points or base stations, as well as peripherals such as headsets, printers, or other devices.

Connectivity 2170 can include multiple different types of connectivity. To generalize, the computing device 2100 is illustrated with cellular connectivity 2172 and wireless connectivity 2174. Cellular connectivity 2172 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 2174 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 2180 include hardware interfaces and connectors, as well as software components (e.g., drivers, protocol stacks) to make peripheral connections. It will be understood that the computing device 2100 could both be a peripheral device ("to" 2182) to other computing devices, as well as have peripheral devices ("from" 2184) connected to it. The computing device 2100 commonly has a "docking" connector to connect to other computing devices for purposes such as managing (e.g., downloading and/or uploading, changing, synchronizing) content on computing device 2100. Additionally, a docking connector can allow computing device 2100 to connect to certain peripherals that allow the computing device 2100 to control content output, for example, to audiovisual or other systems.

In addition to a proprietary docking connector or other proprietary connection hardware, the computing device 2100 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, an apparatus is provided which comprises: a processor operable to execute a virtual machine manager (VMM) which is to manage a virtual machine (VM) for a hardware intellectual property (IP) block; a communication fabric; and a hardware IP block coupled to the processor via the communication fabric, wherein the hardware IP block is to be coupled to a first set of one or more sensors, and wherein the VM and the hardware IP block are operable to process data collected from the first set of one or more sensors. In some embodiments, the communication fabric is coupled to a second set of one or more sensors.

In some embodiments, the hardware IP block is an always-ON (AON) hardware IP block. In some embodiments, the AON hardware IP block is to autonomously operate with the first set of one or more sensors while the VM is asleep. In some embodiments, the AON hardware IP block is to wake up the VM when an event is detected by the first set of one or more sensors or when the data collected from the first set of one or more sensors is to be delivered to the processor. In some embodiments, the hardware IP block includes: a processing core; a Level-1 cache; and a memory.

In some embodiments, the memory is to include a real-time operating system with hardware and debug capabilities and sensor firmware to process the data collected from the first set of one or more sensors. In some embodiments, the first set of one or more sensors include at least one of: Uncalibrated Magnetometer; Calibrated Magnetometer; Accelerometer; Accelerometer with offset correction; Uncalibrated Gyroscope; Calibrated Gyroscope; Gyroscope with offset correction; Gravity linear acceleration orientation or compass; Physical activity sensor; Pedometer; Significant motion and tilt selector; Movement detection; Face up/down landscape portrait; DM 6DOF AM or inclination AM; Ambient light sensor; Proximity sensor; or Pressure sensor.

In another example, a machine-readable media is provided having machine executable instructions stored thereon, that when executed, cause one or more machines to perform an operation comprising: receive a first instruction from an operating system (OS) to provide the OS with sensor data collected by a hardware intellectual property (IP) block which is coupled to a first set of one or more sensors; instruct the hardware IP block to transmit the sensor data; receive the sensor data; analyze at least part of the sensor data; and provide the sensor data or the analyzed part of the sensor data to the OS.

In some embodiments, further machine executable instructions are provided, that when executed, cause the one or more machines to perform an operation comprising: receive a second instruction from the OS to provide the OS with sensor data from a second set of one or more sensors; receive the sensor data from the second set; analyze at least part of the sensor data; and provide the sensor data or the analyzed part of the sensor data to the OS. In some embodiments, the hardware IP block is an always-on (AON) hardware IP block.

In some embodiments, machine executable instructions are provided, that when executed, cause the one or more machines to perform an operation comprising: receive an instruction from the OS to enter a low power state; enter the low power state; and receive an indication from the AON hardware IP block to wake up from the low power state when the AON hardware IP block detects an event by at least one of the one or more sensors of the first set or when the data collected from the one or more sensors of the first set is to be transmitted.

In another example, a system is provided which comprises: a memory; a processor coupled to the memory, the processor operable to execute a virtual machine manager (VMM) which manages a virtual machine (VM) for a hardware intellectual property (IP) block; a first communication fabric; a hardware IP block coupled to the processor via the first communication fabric; a second communication fabric; a first set of one or more sensors coupled to the hardware IP block via the second communication fabric, and wherein the VM and the hardware IP block are operable to process data collected from the first set of one or more sensors; and a wireless interface for allowing the processor to communicate with another device.

In some embodiments, the second communication fabric is I2C compliant fabric. In some embodiments, the system comprises a second set of one or more sensors coupled to the processor via the first communication fabric. In some embodiments, the second set of one or more sensors are to consume more power than the first set of one or more sensors. In some embodiments, the hardware IP block is operable to couple to the processor via an audio input-output interface.

In some embodiments, the hardware IP block is an always-ON (AON) hardware IP block. In some embodiments, the AON hardware IP block is to autonomously operate with the first set of one or more sensors while the VM is asleep. In some embodiments, the AON hardware IP block is to wake up the VM when an event is detected by the first set of one or more sensors or when the data collected from the first set of one or more sensors is to be delivered to the processor.

In another example, a method is provided which comprises: receiving a first instruction from an operating system (OS) to provide the OS with sensor data collected by a hardware intellectual property (IP) block which is coupled to a first set of one or more sensors; instructing the hardware IP block to transmit the sensor data; receiving the sensor data; analyzing at least part of the sensor data; and providing the sensor data or the analyzed part of the sensor data to the OS.

In some embodiments, the method comprises: receiving a second instruction from the OS to provide the OS with sensor data from a second set of one or more sensors; receiving the sensor data from the second set; analyzing at least part of the sensor data; and providing the sensor data or the analyzed part of the sensor data to the OS. In some embodiments, the hardware IP block is an always-on (AON) hardware IP block. In some embodiments, the method comprises: receiving an instruction from the OS to enter a low power state; entering the low power state; and receiving an indication from the AON hardware IP block to wake up from the low power state when the AON hardware IP block detects an event by at least one of the one or more sensors of the first set or when the data collected from the one or more sensors of the first set is to be transmitted.

In another example, an apparatus is provided which comprises: means for receiving a first instruction from an operating system (OS) to provide the OS with sensor data collected by a hardware intellectual property (IP) block which is coupled to a first set of one or more sensors; means for instructing the hardware IP block to transmit the sensor data; means for receiving the sensor data; means for analyzing at least part of the sensor data; and means for providing the sensor data or the analyzed part of the sensor data to the OS.

In some embodiments, the apparatus comprises: means for receiving a second instruction from the OS to provide the OS with sensor data from a second set of one or more sensors; means for receiving the sensor data from the second set; means for analyzing at least part of the sensor data; and means for providing the sensor data or the analyzed part of the sensor data to the OS. In some embodiments, the hardware IP block is an always-on (AON) hardware IP block. In some embodiments, the apparatus comprises: means for receiving an instruction from the OS to enter a low power state; means for entering the low power state; and means for receiving an indication from the AON hardware IP block to wake up from the low power state when the AON hardware IP block detects an event by at least one of the one or more sensors of the first set or when the data collected from the one or more sensors of the first set is to be transmitted.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
    a processor operable to execute a virtual machine manager (VMM) which is to manage a virtual machine (VM) for a hardware intellectual property (IP) block, wherein the hardware IP block is powered on even when the VM is asleep;
    a communication fabric; and
    the hardware IP block coupled to the processor via the communication fabric, wherein the hardware IP block is to be coupled to a first set of one or more sensors, and wherein the VM and the hardware IP block are operable to process data collected from the first set of one or more sensors.

2. The apparatus of claim 1, wherein the communication fabric is coupled to a second set of one or more sensors.

3. The apparatus of claim 1, wherein the hardware IP block is an always-ON (AON) hardware IP block to perform continuous sensing and processing of the data collected from the first set of one or more sensors.

4. The apparatus of claim 1, wherein the hardware IP block is an always-ON (AON hardware IP block which is to autonomously operate with the first set of one or more sensors while the VM is asleep.

5. The apparatus of claim 4, wherein the AON hardware IP block is to wake up the VM when an event is detected by the first set of one or more sensors or when the data collected from the first set of one or more sensors is to be delivered to the processor.

6. The apparatus of claim 1, wherein the hardware IP block includes:
    a processing core;
    a Level-1 cache; and
    a memory.

7. The apparatus of claim 6, wherein the memory is to include a real-time operating system with hardware and debug capabilities and sensor firmware to process the data collected from the first set of one or more sensors.

8. The apparatus of claim 1, wherein the first set of one or more sensors include at least one of:
    Uncalibrated Magnetometer;
    Calibrated Magnetometer;
    Accelerometer;
    Accelerometer with offset correction;
    Uncalibrated Gyroscope;
    Calibrated Gyroscope;
    Gyroscope with offset correction;
    Gravity linear acceleration orientation or compass;
    Physical activity sensor;
    Pedometer;
    Significant motion and tilt selector;
    Movement detection;
    Face up/down landscape portrait;
    DM 6DOF AM or inclination AM;
    Ambient light sensor;
    Proximity sensor; or
    Pressure sensor.

9. Non-transitory machine-readable media having machine executable instructions stored thereon, that when executed, cause one or more machines to perform an operation comprising:
    receive a first instruction from an operating system (OS) to provide the OS with sensor data collected by a hardware intellectual property (IP) block which is coupled to a first set of one or more sensors, wherein the hardware IP block is powered on even when the VM is asleep;
    instruct the hardware IP block to transmit the sensor data;
    receive the sensor data;
    analyze at least part of the sensor data; and
    provide the sensor data or the analyzed part of the sensor data to the OS.

10. The non-transitory machine-readable media of claim 9 having machine executable instructions stored thereon, that when executed, cause the one or more machines to perform an operation comprising:
    receive a second instruction from the OS to provide the OS with sensor data from a second set of one or more sensors;
    receive the sensor data from the second set;
    analyze at least part of the sensor data; and
    provide the sensor data or the analyzed part of the sensor data to the OS.

11. The non-transitory machine-readable media of claim 9, wherein the hardware IP block is an always-on (AON) hardware IP block to perform continuous sensing and processing of the sensor data received.

12. The non-transitory machine-readable media of claim 11 having machine executable instructions stored thereon, that when executed, cause the one or more machines to perform an operation comprising:
    receive an instruction from the OS to enter a low power state;
    enter the low power state; and
    receive an indication from the AON hardware IP block to wake up from the low power state when the AON hardware IP block detects an event by at least one of the one or more sensors of the first set or when the data collected from the one or more sensors of the first set is to be transmitted.

13. A system comprising:
    a memory;

a processor coupled to the memory, the processor operable to execute a virtual machine manager (VMM) which manages a virtual machine (VM) for a hardware intellectual property (IP) block, wherein the hardware IP block is powered on even when the VM is asleep;

a first communication fabric;

the hardware IP block coupled to the processor via the first communication fabric;

a second communication fabric;

a first set of one or more sensors coupled to the hardware IP block via the second communication fabric, and wherein the VM and the hardware IP block are operable to process data collected from the first set of one or more sensors; and a wireless interface to allow the processor to communicate with another device.

14. The system of claim 13, wherein the second communication fabric is I2C compliant fabric.

15. The system of claim 13 comprises a second set of one or more sensors coupled to the processor via the first communication fabric.

16. The system of claim 15, wherein the second set of one or more sensors are to consume more power than the first set of one or more sensors.

17. The system of claim 13, wherein the hardware IP block is operable to couple to the processor via an audio input-output interface.

18. The system of claim 13, wherein the hardware IP block is an always-ON (AON) hardware IP block to perform continuous sensing and processing of the data collected from the first set of one or more sensors.

19. The system of claim 13, wherein the hardware IP block is an always-ON (AON hardware IP block which is to autonomously operate with the first set of one or more sensors while the VM is asleep.

20. The system of claim 19, wherein the AON hardware IP block is to wake up the VM when an event is detected by the first set of one or more sensors or when the data collected from the first set of one or more sensors is to be delivered to the processor.

21. The apparatus of claim 1, wherein the hardware IP block includes firmware to implement method for virtual sensors and calibration of sensors.

22. The apparatus of claim 2, wherein the processor is to communicate with the second set of one or more sensors via the communication fabric.

23. The apparatus of claim 1, wherein the VM is to emulate a sensor hub.

24. The apparatus of claim 1, wherein the VM comprises:

a sensor hub kernel with hardware drivers;

a processing logic, and sensor drivers for the sensors not connected to the hardware IP block.

25. The apparatus of claim 1, wherein the VM is to request the hardware IP block to buffer sensor data and send it to the VM.

* * * * *